(12) United States Patent
Maurice

(10) Patent No.: US 8,078,148 B1
(45) Date of Patent: Dec. 13, 2011

(54) MEMORY FULL PIPELINE

(75) Inventor: Robbie Maurice, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 507 days.

(21) Appl. No.: 12/361,730

(22) Filed: Jan. 29, 2009

Related U.S. Application Data

(63) Continuation of application No. 11/314,976, filed on Dec. 21, 2005, now Pat. No. 7,574,204.

(60) Provisional application No. 60/639,251, filed on Dec. 27, 2004.

(51) Int. Cl.
*H04Q 7/22* (2006.01)

(52) U.S. Cl. ........................ 455/412.1; 370/230; 370/234

(58) Field of Classification Search .............. 455/412.1, 455/414.1, 418, 556.1, 556.2, 557; 370/230, 370/232, 234, 235, 253
See application file for complete search history.

(56) References Cited

U.S. PATENT DOCUMENTS

| | | | |
|---|---|---|---|
| 5,872,933 A | 2/1999 | Kanai et al. | |
| 6,055,413 A | 4/2000 | Morse et al. | |
| 6,389,457 B2 | 5/2002 | Lazaridis et al. | |
| 6,687,254 B1 | 2/2004 | Ho et al. | |
| 6,731,924 B2 | 5/2004 | Gushiken | |
| 2002/0143973 A1 | 10/2002 | Price | |
| 2003/0156542 A1 | 8/2003 | Connor | |
| 2004/0054847 A1 | 3/2004 | Spencer et al. | |
| 2004/0064607 A1 | 4/2004 | Odakura et al. | |
| 2004/0098545 A1 | 5/2004 | Pline et al. | |
| 2005/0132327 A1 | 6/2005 | Mountain | |
| 2005/0190745 A1 | 9/2005 | Western et al. | |
| 2005/0220128 A1* | 10/2005 | Tucker et al. ................. | 370/412 |

FOREIGN PATENT DOCUMENTS

| | | |
|---|---|---|
| WO | WO 97/22196 | 6/1997 |
| WO | WO 03/005276 A2 | 1/2003 |

* cited by examiner

*Primary Examiner* — Cong Tran

(74) *Attorney, Agent, or Firm* — Louis B. Allard; Borden Ladner Gervais LLP

(57) ABSTRACT

A method of accommodating legacy devices in which application memory is not able to operate fast enough to reliably receive data from a relay or other external device is disclosed. An application queue memory space is provided, either as a separate memory chip or as an area created and maintained by program code, to act as an intermediary between the slower application memory and the external device. This application queue memory space is preferably a transport stack.

12 Claims, 6 Drawing Sheets

MEMORY FULL PIPELINE

CROSS-REFERENCE TO RELATED APPLICATION

This application is a continuation of U.S. patent application Ser. No. 11/314,976, filed on Dec. 21, 2005, now U.S. Pat. No. 7,574,204, granted on Aug. 11, 2009. U.S. patent application Ser. No. 11/314,976 claims the benefit of U.S. Provisional Patent Application Ser. No. 60/639,251, filed Dec. 27, 2004.

FIELD

The disclosed and claimed concept relates to the field of telecommunications and, more particularly, to a method of accommodating slow mail memory data transfers.

BACKGROUND

Handheld wireless communications devices may not be able to adequate handle bursts of data for a particular application, such as e-mail. For example, when the Advanced Programming Interface (API) injects messages in the Outlook message store, Outlook may not be able to transfer received mail messages fast enough to accommodate the mail receive rate.

Thus, it would be desirable to provide a capability of handling bursty e-mail data packets, as found in legacy handheld wireless communications devices.

BRIEF DESCRIPTION OF THE DRAWINGS

Embodiments of disclosed and claimed concept will now be described by way of example with reference to attached figures, wherein:

DETAILED DESCRIPTION

In a wireless handheld communications device, an application queue memory space is established to handle temporary data packet storage for later transfer to application memories that transfer data packets at a slower rate than they are received. One embodiment of an application queue memory space is a transport stack. The transport stack is an embeddable library which can be used on third party handsets in order to receive and send push data. The transport stack operates at a faster data transfer rate than the application memory. The temporary buffer memory is established based on an assumed maximum size; e.g., number of messages and average size of a message to establish the number of bytes. When the device is in coverage, the device registers with a relay. Any overflow of intermediate queue memory, i.e., application queue memory space, for sufficient duration causes the relay to consider the device to be out of coverage, as when the relay currently does when not receiving acknowledgement (ack) signals. The application queue memory space may be implemented as FLASH memory or RAM. The capacity of the application memory, e.g., mail storage memory, and intermediate queue memory, i.e., application queue memory space, varies over time.

Figure 1:
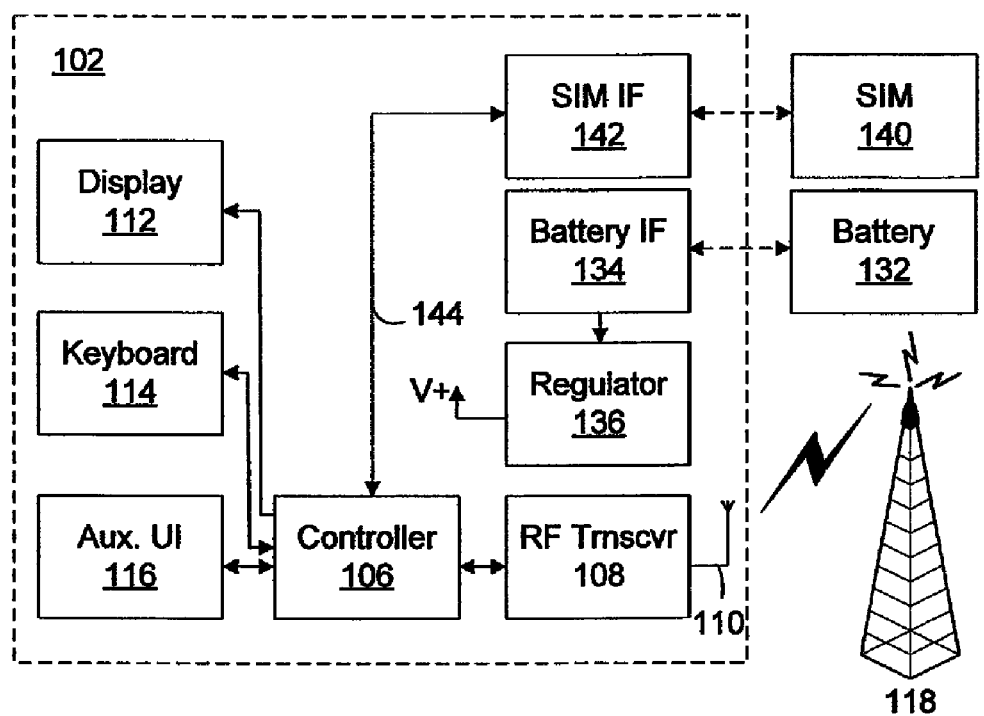
FIG. 1 is a block diagram that illustrates pertinent components of a wireless communications device that communicates within a wireless communication network.

FIG. 1 is a block diagram of a communication system that includes a mobile station 102 that communicates through a wireless communication network. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110. Preferably, the communication system is a push technology communication system in which messages are automatically sent (i.e., pushed) from a message service to the mobile station 102.

Typically, controller 106 is embodied as a central processing unit (CPU) which runs operating system software in a memory component. Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network, a telephone number to place a telephone call, commands to be executed on mobile station 102, and possibly other or different user inputs.

Mobile station 102 sends communication signals to and receives communication signals from the wireless network over a wireless link via antenna 110. RF transceiver circuitry 108 performs functions similar to those of a base station and a base station controller (BSC), including for example modulation/demodulation and possibly encoding/decoding and encryption/decryption. It is also contemplated that RF transceiver circuitry 108 may perform certain functions in addition to those performed by a BSC. It will be apparent to those skilled in art that RF transceiver circuitry 108 will be adapted to particular wireless network or networks in which mobile station 102 is intended to operate.

Mobile station 102 includes a battery interface (IF) 134 for receiving one or more rechargeable batteries 132. Battery 132 provides electrical power to electrical circuitry in mobile station 102, and battery IF 134 provides for a mechanical and electrical connection for battery 132. Battery IF 134 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface (IF) 142. SIM 140 is one type of a conventional "smart card" used to identify an end user (or subscriber) of mobile station 102 and to personalize the device, among other things Without SIM 140, the mobile station terminal is not fully operational for communication through the wireless network. By inserting SIM 140 into mobile station 102, an end user can have access to any and all of his/her subscribed services. SIM 140 generally includes a processor and memory for storing information. Since SIM 140 is coupled to SIM IF 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may, for example, consist of a single unit, such as a data communication device, a multiple-function communication device with data and voice communication capabilities, a personal digital assistant (PDA) enabled for wireless communication, or a computer incorporating an internal modem. Alternatively, mobile station 102 may, for example, be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Figure 2:
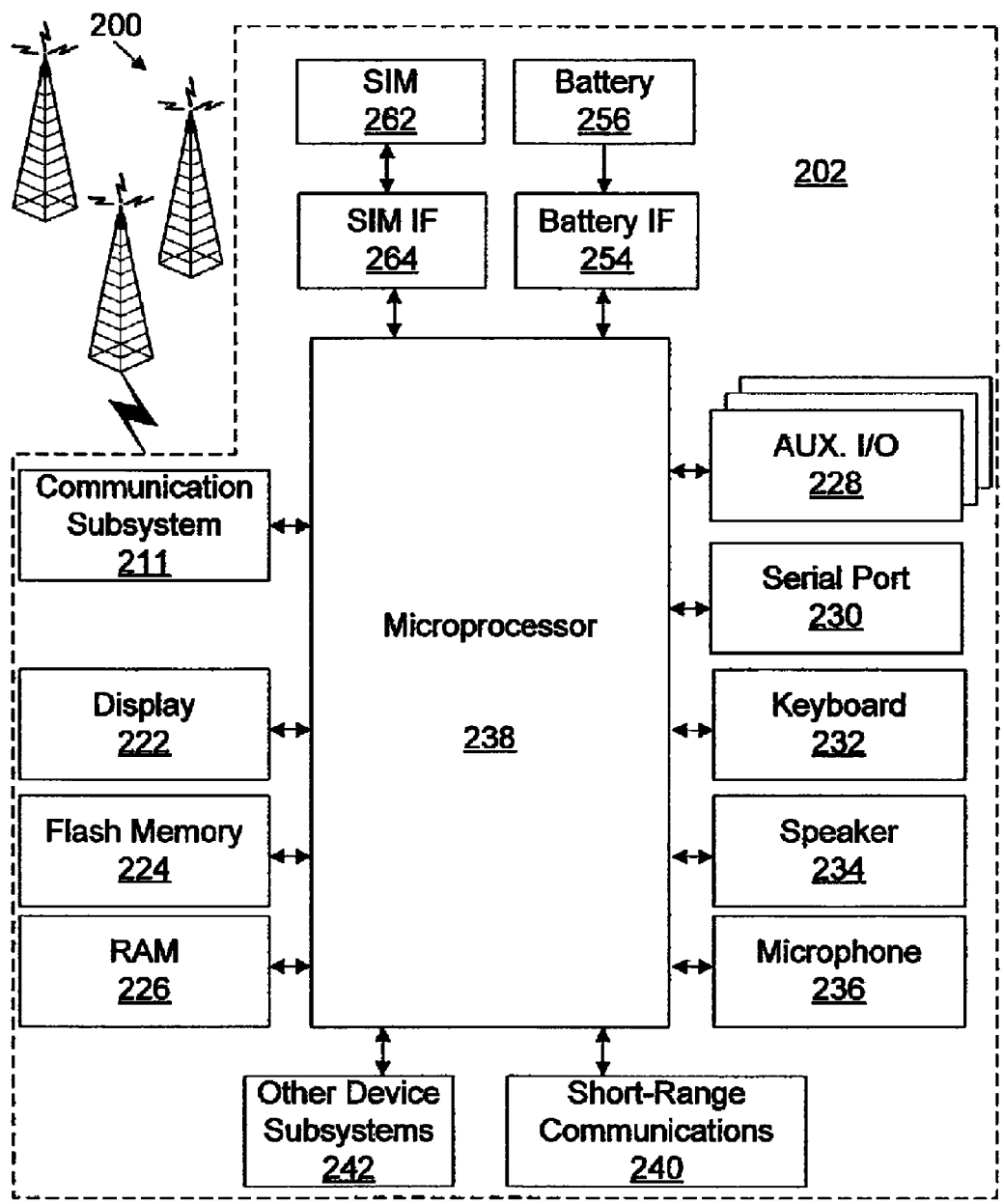
FIG. 2 is a detailed diagram of the wireless communications device of FIG. 1.

FIG. 2 is a detailed block diagram of mobile station 202. Mobile station 202 is preferably a two-way communication device having at least voice and advanced data communication capabilities, including the capability to communicate with other computer systems. Depending on the functionality provided by mobile station 202, it may be referred to as, for example, a data messaging device, a two-way pager, a cellular telephone with data messaging capabilities, a wireless Internet appliance, or a data communication device with or without telephony capabilities. Mobile station 202 may communicate with any one or more of a plurality of fixed transceiver stations 200 within its geographic coverage area.

Mobile station 202 will normally incorporate a communication subsystem 211, which may include a receiver, a transmitter, associated components such as one or more embedded or internal antenna elements, local oscillators (LOs), and a processing module such as a digital signal processor (DSP). Communication subsystem 211 is analogous to, for instance, RF transceiver circuitry 108 and antenna 110 shown in FIG. 1. As will be apparent to those skilled in field of communications, particular design of communication subsystem 211 may depend upon the communication network in which mobile station 202 is intended to operate.

Network access is associated with a subscriber or user of mobile station 202 and therefore mobile station 202 requires a Subscriber Identity Module or "SIM" card 262 to be inserted in a SIM IF 264 in order to operate in the network. SIM card 262 includes those features described in relation to FIG. 1. Mobile station 202 is a battery-powered device so it also includes a battery IF 254 for receiving one or more rechargeable batteries 256. Such a battery 256 provides electrical power to most if not all electrical circuitry in mobile station 202, and battery IF 254 provides for a mechanical and electrical connection for it. The battery IF 254 is coupled to a regulator which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 may perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or other such storage element. Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A particular application that may be loaded onto mobile station 202 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In at least one embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system.

Additional applications may also be loaded onto mobile station 202 through network 200, an auxiliary I/O subsystem 228, serial port 230, short-range communications subsystem 240, or any other suitable subsystem 242, and installed by a user in RAM 226 or a non-volatile store for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222, to auxiliary I/O device 228, or both, as described further herein with reference, for example, to FIGS. 3-7. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. Such composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 may be implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, a Bluetooth communication module to provide for communication with similarly-enabled systems and devices, or other communication system.

In accordance with an embodiment of the disclosed and claimed concept, the exemplary mobile station 202 is a multi-tasking handheld wireless communications device configured for sending and receiving data items and for making and receiving voice calls. To provide a user-friendly environment to control the operation of mobile station 202, an operating system resident on station 202 provides a Graphic User Interface (GUI) having a main screen and a plurality of sub-screens navigable from the main screen, for instance.

Figure 3:
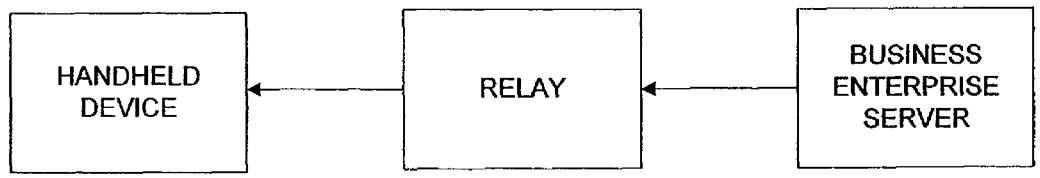
FIG. 3 illustrates an embodiment of an environment of use.
Figure 4:
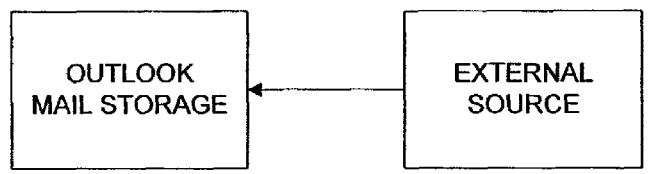
FIG. 4 illustrates a conventional set up.

FIGS. 3-4 illustrate a method of storing data for an application memory, such as one that may not be able to handle higher data transfer rates. FIG. 3 illustrates data transfer from a business enterprise server (BES) through a relay to a handheld device. As shown in FIG. 4, a previous approach for storing the received data includes an attempt to transfer data to application memory in real-time.

Figure 5:
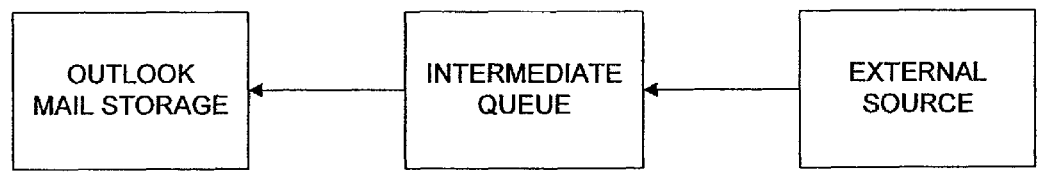
FIG. 5 illustrates an overview of an embodiment of a system.

FIG. 5 illustrates a use of an intermediate queue to store data for an application memory. Specifically, FIG. 5 illustrates an embodiment that uses temporary queue programming code to identify a memory area of the handheld wireless communications device wherein to temporarily store application data to and from the application memory. The memory area, i.e., the application queue memory space, may be a transport stack, i.e., an embeddable library which can be used on third party handsets in order to receive and send push data. The third party handset may have an application memory that transfers data at a slower rate than is transmitted from the relay. The transport stack serves as intermediate storage that can store data packets as fast as they are transmitted from the relay.

When the stack receives data, such as an e-mail message, it is passed to the client application (e.g. Outlook) for storage. If the client application takes a sufficiently long time to store the data, the result can include unnecessary wireless data traffic and an undesirable computing load on an infrastructure system. To avoid this, the transport stack time stamps all data received. If that data is not processed by the client application within a suitable time frame, the stack will simulate an out of coverage scenario to the infrastructure system. This causes the infrastructure system to stop sending data to the device, to mark the device as out of coverage, and to queue any data for the device. However the stack does maintain a connection to the registration server in order to maintain the connectivity level of the device. Once the data has been processed by the client application, the stack sends a control message back to the infrastructure causing the infrastructure to mark the device as in coverage and send any pending data to it.

Figure 6:
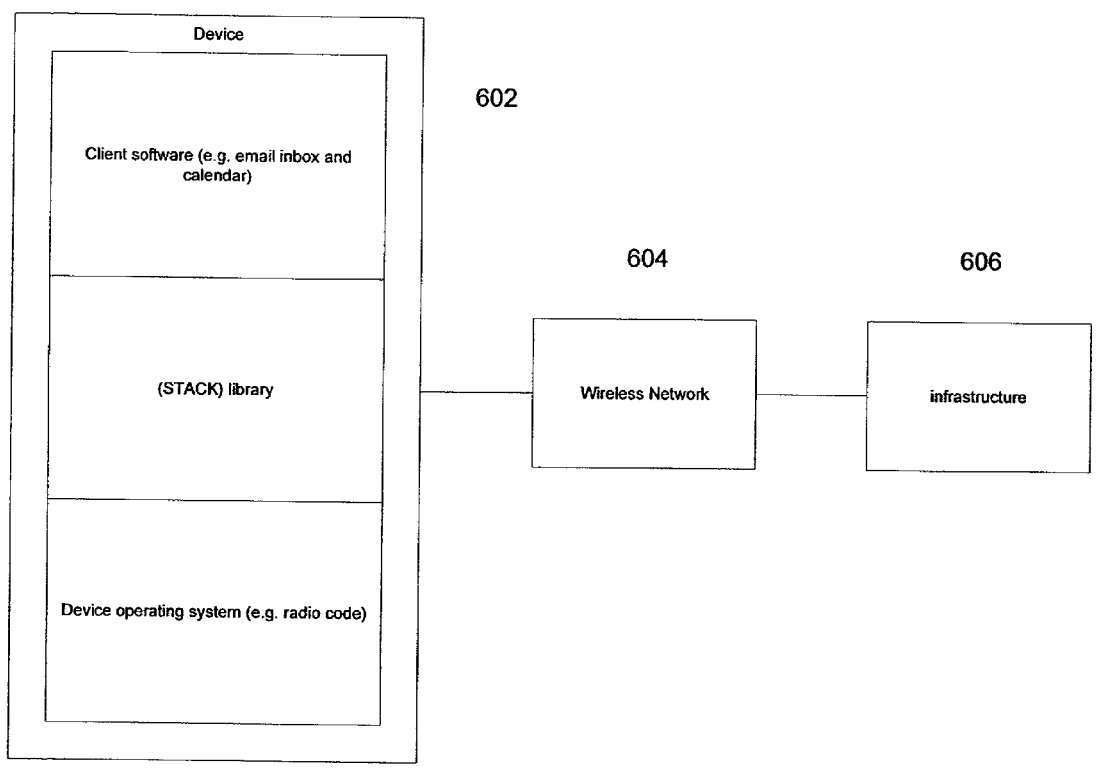
FIG. 6 illustrates a block diagram of an embodiment of a system.

FIG. 6 illustrates an exemplary system in which an application queue memory space is used. A handheld wireless communications device 602 includes client software such as an e-mail inbox and a calendar, a transport stack, i.e., library, and a device operating system (e.g., radio code). The transport stack serves as the application queue memory space and receives data packets that are received through the wireless network 604 from the communications infrastructure 606.

Figure 7:
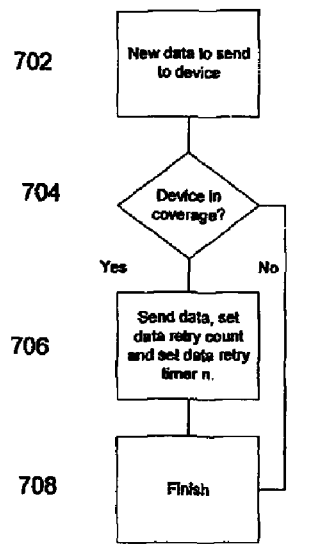
FIG. 7 illustrates an embodiment of a method of sending data to a handheld wireless communications device.
Figure 8:
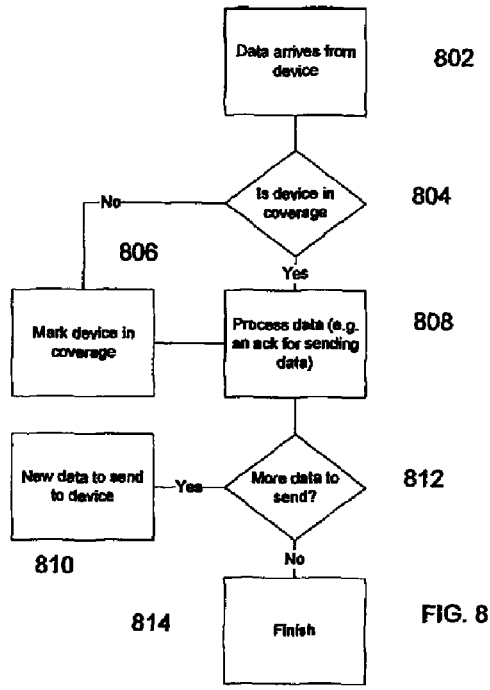
FIG. 8 illustrates an embodiment of a method of processing data from the handheld wireless communications device.
Figure 9:
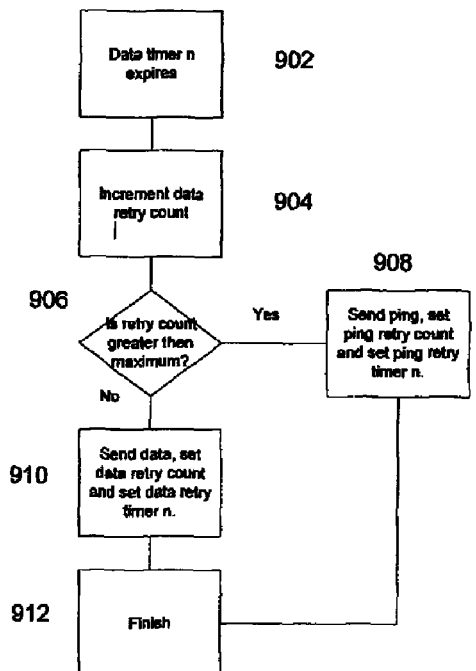
FIG. 9 illustrates an embodiment of a method for determining data transmission time out.
Figure 10:
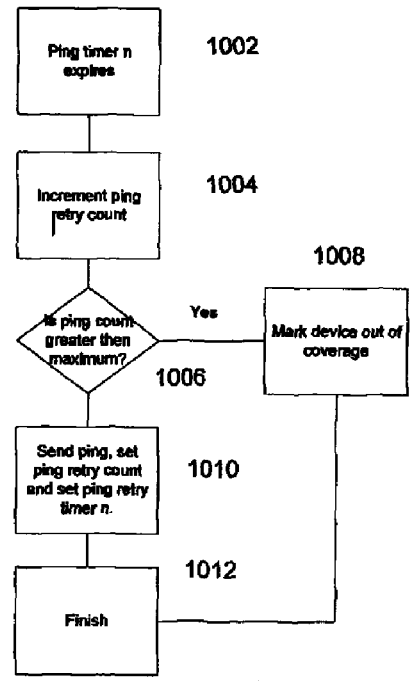
FIG. 10 illustrates an embodiment of a method for determining an out of coverage transmission.
Figure 11:
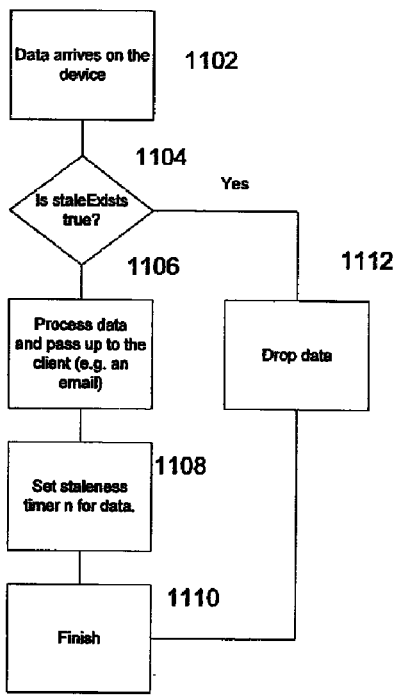
FIG. 11 illustrates an embodiment of a method for timestamping data received on the handheld wireless communications device.
Figure 12:
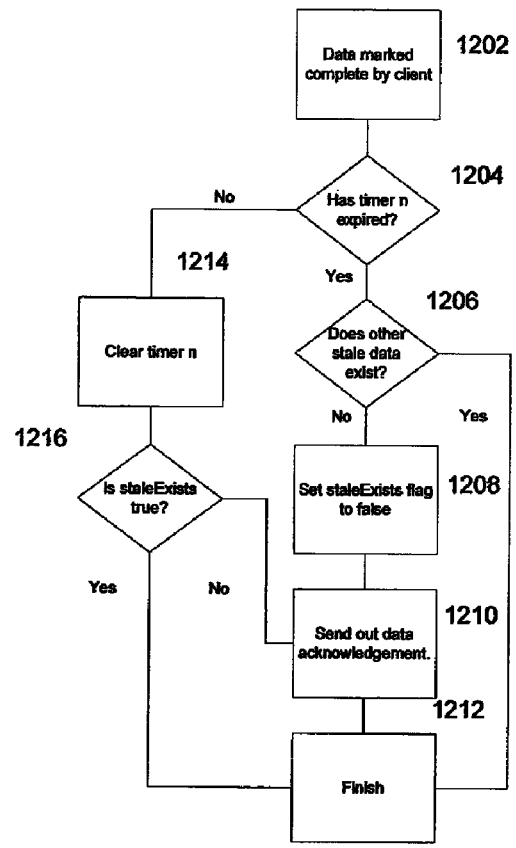
FIG. 12 illustrates an embodiment of a method for processing data that is not stale.
Figure 13:
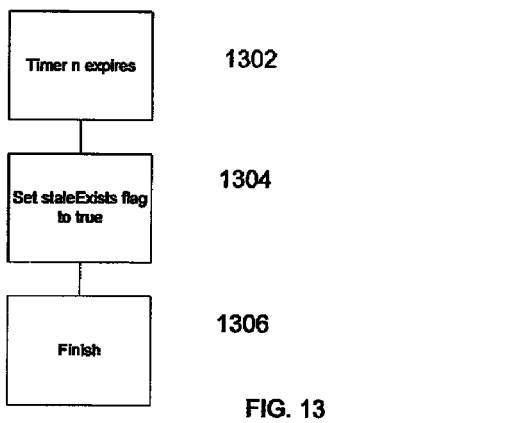
FIG. 13 illustrates an embodiment of a method for determining if data is stale.

The method may be illustrated by consideration of the server side of data packet transmission via infrastructure 606 in FIGS. 7-10 and the device side of data packet reception via wireless network 604 in FIGS. 11-13. Server side processing involves new data to send to the device (FIG. 7) and processing of data from the device (FIG. 8). Timers may be set for data transmission time out (FIG. 9) and out of coverage determinations (FIG. 10). Data side processing involves timestamping received data (FIG. 11), processing data that is not stale (FIG. 12), and determining data as stale (FIG. 13).

Server side processing includes data transfer, as well as data and communication time out. In FIG. 7, data to be sent to the wireless handheld communications device is prepared, as at 702, such as by being placed in a buffer before being sent over the air. A determination is made at 704 as to whether the wireless handheld communications device is in coverage. If it is, then the data is transmitted, a data retry timer is cleared, and a data retry counter is cleared, as at 706. Otherwise, no data transmission occurs, as at 708.

In FIG. 8, data arrives from the wireless handheld communications device, as at 802. A determination is made, as at 804, as to whether the wireless handheld communications device is in coverage. If not, the device is treated as being in coverage because data has been received from it, as at 806.

The data is then processed, as at 808. This may be accomplished by an acknowledgment signal sent from the device.

A determination is made as to whether to send more data 812. If so, new data is sent, as at 810. Otherwise, other processing occurs 814.

In FIG. 9, the server will attempt to transmit data for an interval of time and then will ping the wireless handheld communications device if there has been no successful transfer of data during the interval of time. For instance, and as at 902, the data timer for transmitting data may expire. The data retry counter is incremented, as at 904. If at 906 the retry count is greater than a preset maximum threshold, a ping is sent, as at 908. In which case, the ping retry count is incremented and the ping retry timer continues to approach a time out state, also as at 908. Otherwise, as at 910, the data is sent, the data retry count is cleared, and the data retry time is reset. Processing finishes at 912.

In FIG. 10, the ping timer expires, as at 1002, and the ping retry count is incremented, as at 1004. If at 1006 the ping count exceeds a preset maximum, the wireless handheld communications device is at 1008 considered to be out of coverage. Otherwise, as at 1010, a ping is sent, the ping retry count is incremented, and the ping retry timer continues. Processing finishes at 1012.

Data that is received by the handheld wireless communications device is queued in the application queue memory space and is stored in the appropriate application memory unless the data becomes stale. In FIG. 11, data arrives on the device, as at 1102. After a predetermined period of time, a check is made, as at 1104, as to whether the data is stale. Such checking for staleness may occur, for example, through polling software code. If a data entry, i.e., a data packet or message, is determined at 1104 to be stale, the data entry is dropped, as at 1112. Dropping may be achieved by clearing the memory location or changing one or more pointers so as to free the memory pertaining to the stale data entry to be overwritten.

If at 1104 the data entry is not stale, the data entry is passed, as at 1106, to the client, such as an e-mail application. A staleness timer for such data entry is reset, as at 1108. Processing finishes at 1110.

In FIG. 12, data entries that have been successfully transferred to application memory are marked, i.e., flagged, as complete by the client application, as at 1202. If at 1204 the staleness timer has not expired for a data entry, the staleness timer is cleared, as at 1214. If at 1216 a stale data flag for the data entry is not in a TRUE state, a data transfer acknowledgment is sent at 1210. Otherwise, processing finishes at 1212.

If at 1204 the staleness timer has expired for a data entry, a determination is made at 1206 as to whether there is data that is stale. If no data is stale, then at 1208 the stale data flag for that data entry is cleared, i.e., is set to a FALSE state, and a data transfer acknowledgment is sent at 1210. Otherwise, processing finishes at 1212.

In FIG. 13, if at 1302 the data entry timer expires, the state data flag is set at 1304 to a TRUE state. Processing finishes at 1306.

The above-described embodiments of the present application are intended to be examples only. Those of skill in the art may effect alterations, modifications and variations to the particular embodiments without departing from the scope of the application. The disclosed and claimed concepts described herein and in the recited claims are intended to cover and embrace all suitable changes in technology.

I claim:

1. A method for accommodating an application memory having a data transfer rate capability lower than desired to accommodate data received by a handheld communication device from an external device, the method comprising:
    creating an application queue memory space whose size is determined by at least one of a number of messages and an average message size;
    receiving data for the application memory;
    storing the data in the application queue memory space;
    transferring the data from the application queue memory space to the application memory at a rate determined at least in part by the transfer rate capabilities of the application memory, and,
    responsive to an overflow of the application queue memory space, causing the external device to consider the handheld communications device to be out of coverage.

2. The method of claim 1, further comprising employing as the application queue memory space a transport stack.

3. The method of claim 1, further comprising pinging the handheld wireless communications device by the external device.

4. The method of claim 3, further comprising marking the handheld wireless communications device as out of coverage responsive to an expiration of a ping timer on the external device.

5. The method of claim 4, further comprising employing as the external device a relay.

6. The method of claim 4, further comprising employing as the external device a server.

7. The method of claim 1, further comprising discarding stale data from the application queue memory space.

8. A system for accommodating on a handheld wireless communications device an application memory having a data transfer rate capability lower than the rate of data received by the handheld wireless communications device, the system comprising:
    a handheld wireless communications device comprising a receiver, a processor, an application queue memory space, and an application memory;
    the receiver being structured to receive wireless data signals;
    the processor being structured to process and control data transfer to the handheld wireless communications device at a data rate substantially corresponding with the data rate of a received wireless data signal;
    the application memory having a data transfer rate than is slower than the data rate of the received wireless data signal;
    the application queue memory space being structured to store received data before it is stored in the application memory; and,
    an external device that is structured to send the wireless data signal to the handheld wireless communications device,
    the system being structured such that an overflow of the application queue memory causes the external device to consider the handheld wireless communications device to be out of range.

9. The system of claim 8, wherein the application queue memory space is a transport stack.

10. The system of claim 8, wherein the application queue memory space is a library.

11. The system of claim 8, wherein the external device is a relay.

12. The system of claim 8, wherein the external device is a server.

* * * * *